United States Patent [19]

Chang

[11] Patent Number: 5,695,542
[45] Date of Patent: Dec. 9, 1997

[54] METHOD OF PREPARING A SLOW RELEASE FERTILIZER

[76] Inventor: Hsin-Jen Chang, 6/F., No. 99, Fu-Hsing N. Rd., Taipei City, Taiwan

[21] Appl. No.: 557,940
[22] Filed: Nov. 14, 1995
[51] Int. Cl.$^6$ .................. C05B 7/00; C05C 1/00; C05C 5/00; C05G 3/00
[52] U.S. Cl. .................. 71/33; 71/34; 71/56; 71/63; 71/64.11; 71/903; 71/904
[58] Field of Search .................. 71/64.11, 903, 71/904, 31, 33, 34, 56, 57, 58, 59, 63

[56] References Cited

U.S. PATENT DOCUMENTS 3,441,400  4/1969  Otrhalek .................. 71/904

FOREIGN PATENT DOCUMENTS 2851701  11/1978  Germany .................. 71/904
54-66259  10/1977  Japan .................. 71/903
61-221285  3/1985  Japan .................. 71/903

Primary Examiner—Ferris Lander
Assistant Examiner—Karen Joyce
Attorney, Agent, or Firm—Morton J. Rosenberg; David I. Klein

[57] ABSTRACT

A method of preparing a slow releasing fertilizer, including the steps of: I) putting twenty parts of inorganic fertilizer and one part of water by weight into a mixer for mixing into a mixture; II) heating the mixture to 105° C.–115° C. and continuously mixing it, therefore causing the mixture to change to liquid state; III) putting zeolite into the liquefied mixture at a volume of about 3 times of that of the inorganic fertilizer by weight, and then continuously heating and mixing until the liquefied fertilizer is absorbed completely by zeolite; IV) cooling down the liquefied mixture with air to below 80° C., causing the mixture to return to the solid state condition; VI) continuously cooling solid state mixture with air to below 50° C., then adding gelatinous substance to the mixture and continuously mixing it; VII) air drying the mixture into the desired finished product.

4 Claims, 4 Drawing Sheets
(1 of 4 Drawing(s) in Color)

METHOD OF PREPARING A SLOW RELEASE FERTILIZER

BACKGROUND OF THE INVENTION

The present invention provides a technique of preparing a unified product of inorganic fertilizer and zeolite, particularly a technique of preparing a slow releasing fertilizer by melting inorganic fertilizer with heat into the porous structure of zeolite.

Regular inorganic fertilizer such as urea, ammonia sulphate, potassium phosphate, di-potassium phosphate, potassium chloride, potassium nitrate, potassium sulphate, ammonia phosphate, nitrogen fertilizer, phosphate fertilizer, or potassium fertilizer, are water soluble. These water soluble inorganic fertilizers, especially the urea, tend to be carried away from soil into rivers by water, causing rivers to be contaminated.

Furthermore, zeolite is a porous sponge structured mineral. It can be used as water purifier, drying agent, deodorant, feed additives, as well as the processing agent for food and medicine. With the liquid absorbent property and cation exchange capacity (C.B.C.) of zeolite, it possesses water and fertilizer conservation capabilities. Zeolite also contains inorganic fertilizer such as calcium, iron, magnesium, and potassium. Therefore, when zeolite is mixed in cultivated land, it improves soil properties. However, because zeolite contains neither nitrate and phosphate nor organic nutrient matters, it cannot efficiently perform its potential efforts in agriculture.

SUMMARY OF THE INVENTION

The present invention provides the technique of preparing an unified product by melting inorganic fertilizer with heat into the porous structure of zeolite, and then coating a membrane of gelatinous substance on the product to form a slow releasing fertilizer. The slow releasing fertilizer made according to the present invention has the following features:

1. The coat of gelatinous substance and the cation exchange capacity (C.E.C.) of zeolite keep the releasing of fertilizer at a slow speed for fertilizing crops effectively, and prevent the loss of inorganic fertilizer by watering it or by rain.

2. Nitrate and phosphate fertilizers and organic nutrient substances are filled in the gaps of the porous structure of zeolite and provide crops with sufficient nutrition.

3. After all nutrients are released completely, zeolite still perform its cation exchange capacity (C.E.C.) and the conservation capabilities of water and fertilizers.

4. The invented product "Zeolite Urea" can be color coated for use in garden and fold courses in order to increase the merchant values.

BRIEF DESCRIPTION OF THE DRAWINGS

The file of this Patent contains at least one drawing executed in color. Copies of this Patent with color drawing (s) will be provided by the Patent and Trademark Office upon request and payment of the necessary fee.

DETAILED DESCRIPTION OF THE PREFERRED EMBODIMENT

Figure 1:
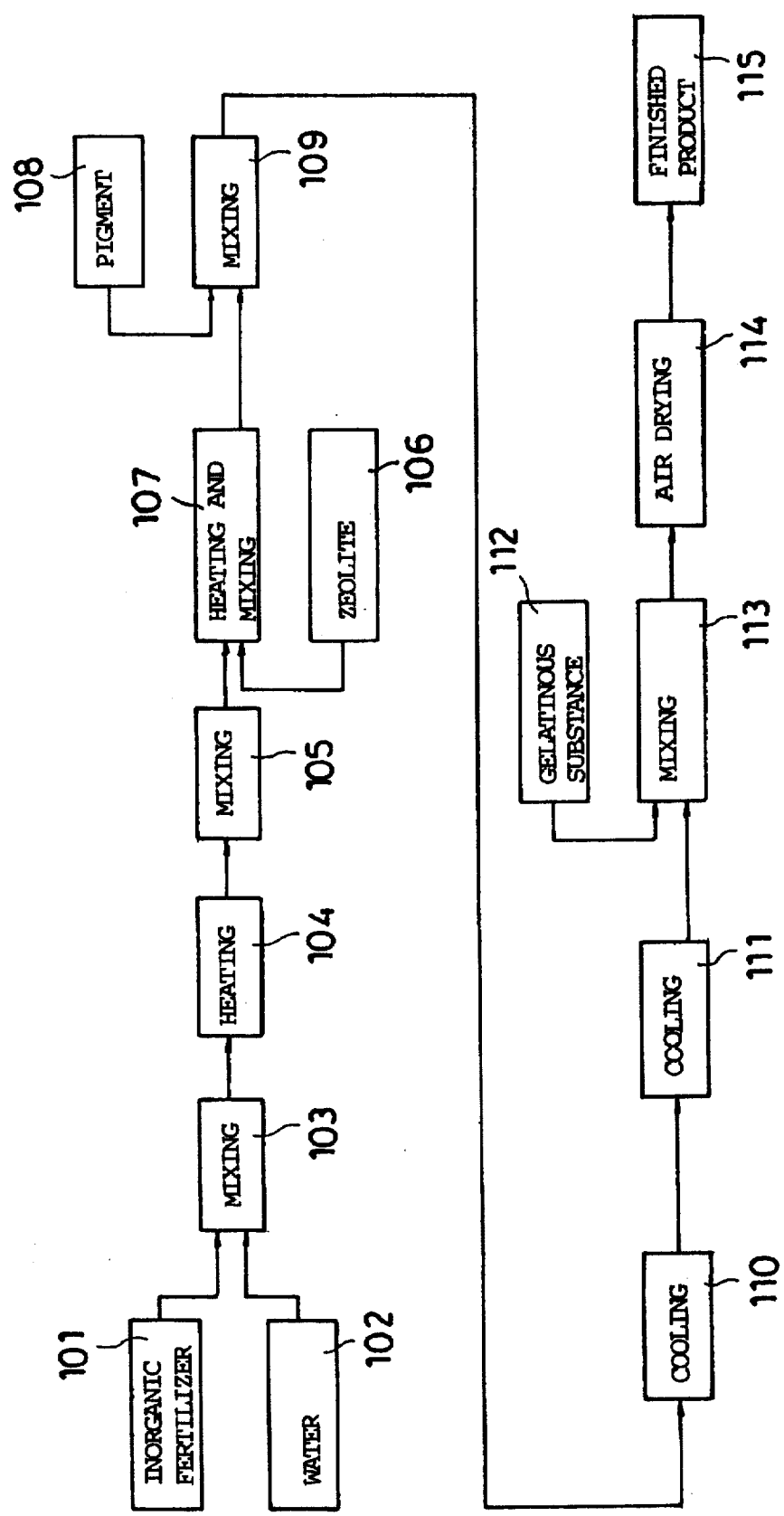
FIG. 1 is a production flow chart according to the present invention.

Referring to FIG. 1, the method of the present invention includes the steps of:

I) Putting twenty parts of inorganic fertilizer (101) and one part of water (102) by weight into a mixer for mixing (103);

II) Heating (104) to 105° C.–115° C. and continuously mixing (105) it, therefore causing it to destroy the crystal structure of inorganic fertilizer and changing it to liquid form;

III) Putting zeolite (106) into the liquefied mixture at a volume of about 3 times of that of the inorganic fertilizer by weight, and then continuously heating and mixing until the liquefied fertilizer is absorbed completely by zeolite (107);

IV) Adding a suitable amount of pigment (108) to the mixture, and continuously mixing (109) the mixture;

V) Cooling down (110) the mixture with air to below 80° C., causing the liquefied fertilizer to return to its crystal form and become a solid inside the porosity and the surface of zeolite;

VI) Constant cooling (111) of solid state mixture with air to below 50° C., then adding gelatinous substance (112) which contains either sodium acrylate, polyvinyl chloride, polyvinyl acetate, methyl cellulose, or carboxyl methyl cellulose to the mixture and continuously mixing (113) it;

VII) Air drying (114) the mixture into the desired finished product (115). The pigment (108) may be eliminated if not required.

The following describes an example of the production of the zeolite urea. The production procedure includes the steps of:

1) Putting 100 kgs of urea into a mixer and start mixing;

2) Putting 5 kgs water into the mixer and heating it to 105° C. when the mixer is continuously operated;

3) Adding 300 kgs of zeolite to the mixture and continuously heating it for 30 minutes, then adding 2 grms of pigment to the liquefied mixture and then continuously mixing the mixture for 10 minutes;

4) Using an air blower to cool the liquefied mixture to 80° C. and continuously mixing it for 10 minutes;

5) Continuously operating the air blower to cool the mixture to 50° C., then adding 10 kgs of a prepared gelatinous substance to the mixture, and then continuously mixing the mixture and blowing it until it is fully dried;

6) Pouring the finished product out of the mixer and packing it into individual packages.

Followings are two experimental tests made between "Regular urea" (obtained from Taiwan Fertilizer Corporation) and "Zeolite Urea" (made according to the present invention).

EXPERIMENTAL TEST 1

Dissolving test in flower pot:

A: Material: 10 inches diameter flower pot, "Regular urea", "Zeolite urea", spray bottle, and water.

B: Method:

(1) Fill up the flower pot with cultivation soil and use partition board to separate soil into two zones. Then feed one zone with "Regular urea" and the other zone with "Zeolite urea".

(2) Spread 50 c.c. of water evenly with spray bottle everyday,

C: Observation: "Regular urea" and record the result.

(2) Observe the gradual speed of dissolvement of "Zeolite urea" and record the result.

Figure 3:
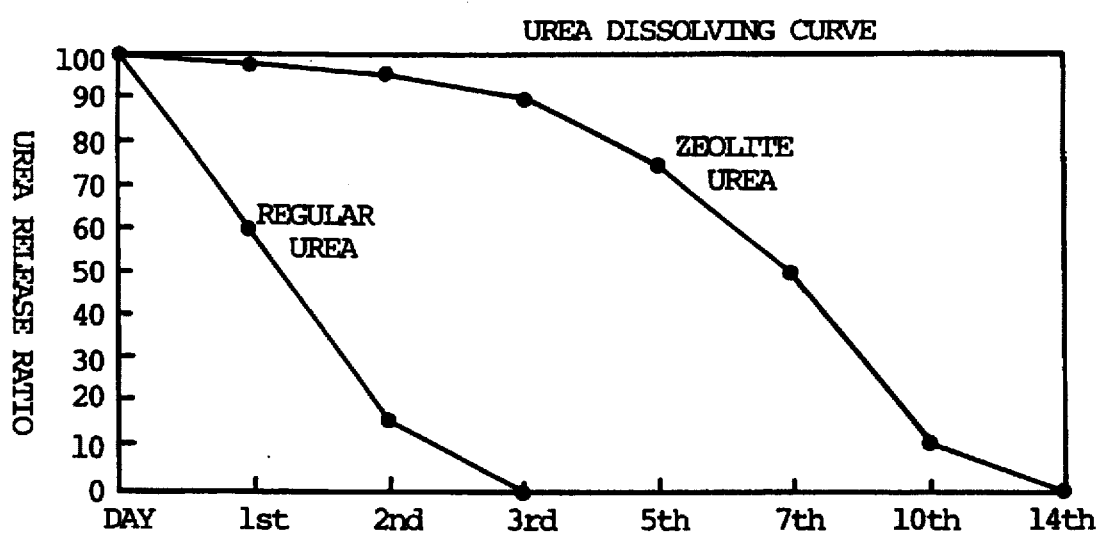
FIG. 3 is a dissolving curve of urea obtained from a dissolving test in a flower pot between regular urea and the zeolite urea according to the present invention.
Figure 4:
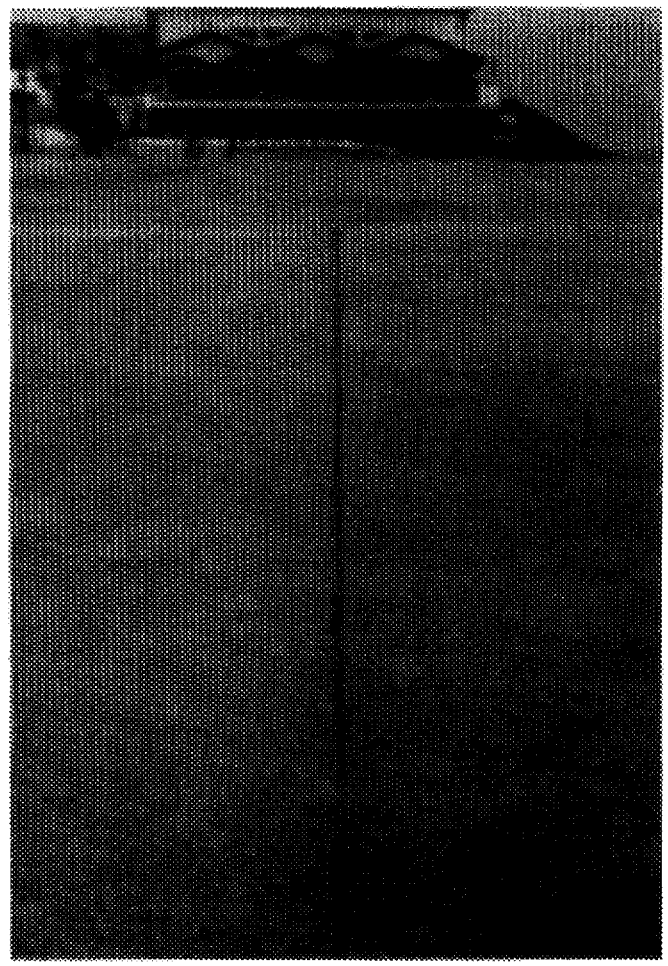
FIG. 4 is a photograph showing a dissolving test at a lawn between regular urea and the zeolite urea according to the present invention.

D: Result:

A dissolving curve of urea is obtained as shown in FIG. 3.

EXPERIMENTAL TEST 2

Efficiency test at lawn:

A: Material: "Regular urea", "Zeolite urea"

B: Method: divide the lawn into the left area and the right area, then evenly spray "Zeolite urea" over the left area in "Regular urea" over the right area respectively at a volume of 25 grams per square meter.

C: Observation: Observe the growth of grass in each are as follows:

D: Result: "Zeolite urea" released fertilizer slowly and the grass in the right area grew abundantly. "Regular zeolite" disappeared in 24 hours after i8its application, and the grass in the left application, and the grass in the left area grow slightly but show the symptom of the lacking of nitrates.

From the aforesaid experimental tests, we obtained the following conclusions:

1) Dissolving time: "Zeolite urea" affected by its porous structure and the attractive force from its cation exchange capacity (C.E.C.) together with the protection from the coated membrane of gelatinous substance, the nitrate fertilizer was released slowly. "Regular urea" is immediately dissolved when it has been watered (see Experimental Test 1).

2) Fertilizing effect: "Zeolite urea" releases fertilizer gradually to provide plants with the necessary nutrients for a long period of time. "Regular urea" releases fertilizer quickly and the actual fertilizing effect is clearly worse than the "Zeolite urea" (see Experimental Test 2).

3) Water and fertilizer conservation capability: "Zeolite urea" keeps conserved water and fertilizer in soil when urea is completely released; "Regular urea" has completely disappeared when dissolved (see Experimental Test 2).

Figure 2:
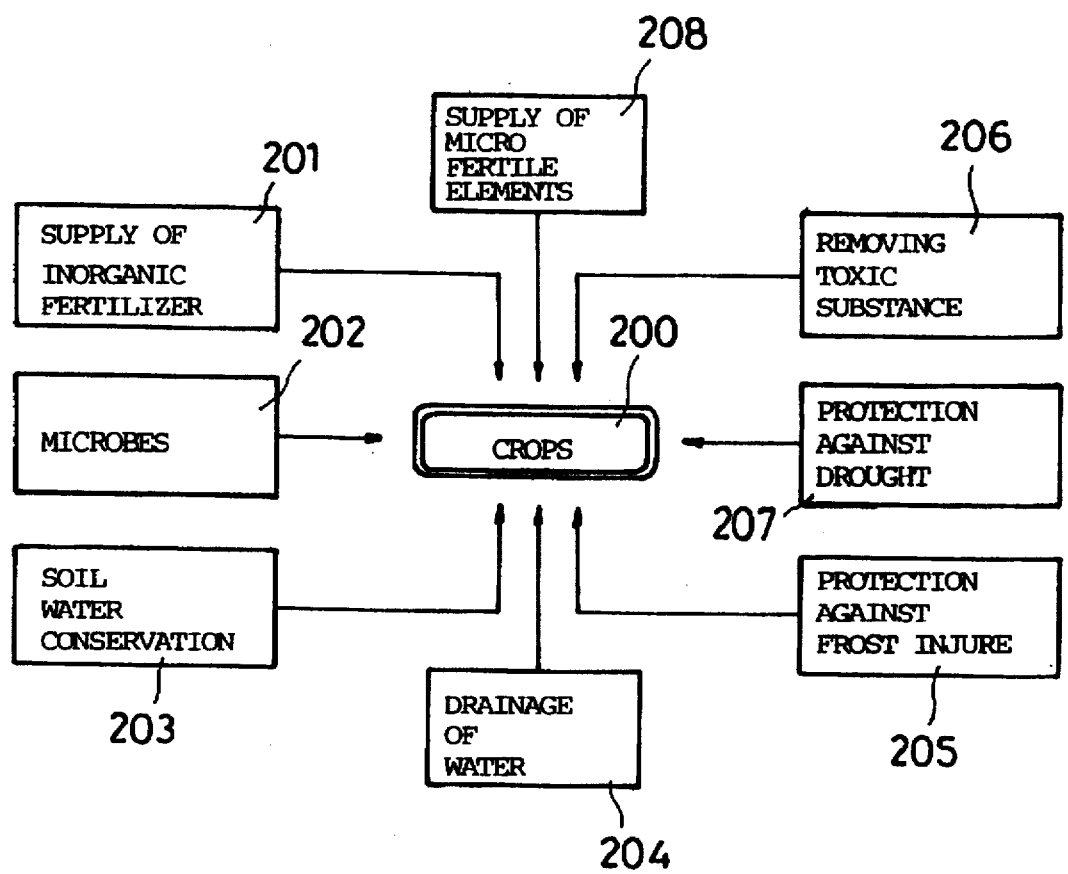
FIG. 2 shows the effect of the slow releasing fertilizer on crops according to the present invention.

Referring to FIG. 2, the slow releasing fertilizer of the present invention achieves the various advantages outlined hereinafter.

1. It preserves inorganic fertilizer (201) such as nitrate, potassium, phosphate, etc., and releases it slowly to crops (200).

2. The porous structure of the slow releasing fertilizer greatly improves soil aeration and activates microbes in soil (202).

3. The porous structure of the slow releasing fertilizer and its cation absorbing capability can conserve water and fertilizer in soil (203).

4. The porous structure of the slow releasing fertilizer helps drain water from the soil.

5. Water in the porous structure of the slow releasing fertilizer will not be frozen at $-10°$ C., and therefore the slow releasing fertilizer can protect crops against frost damage.

6. The porous structure of the slow releasing fertilizer can remove toxic substances such as Hydrogen Sulfide (206).

7. The slow releasing fertilizer can conserve water to protect crops against the damage of a dryness (207).

8. The slow releasing fertilizer provides micro fertile elements (208) that improve the health of crops.

I claim:

1. A method of preparing a slow releasing fertilizer, including the steps of:

I) putting twenty parts of inorganic fertilizer and one part of water by weight into a mixer for mixing into a mixture;

II) heating the mixture to $105°$ C.–$115°$ C. and continuously mixing it, therefore causing the mixture to change to liquid state;

III) putting zeolite into the liquefied mixture at a volume of about 3 times of that of the inorganic fertilizer by weight, and then continuously heating and mixing until the liquefied fertilizer is absorbed completely by zeolite;

IV) cooling down the liquefied mixture with air to below $80°$ C., causing the mixture to return to the solid state condition;

VI) continuously cooling said solid state mixture with air to below $50°$ C., then adding gelatinous substance to the mixture and continuously mixing it;

VII) air drying the mixture into the desired finished product.

2. The method of claim 1 wherein said inorganic fertilizer is water soluble and is a member selected from the group consisting of ammonia sulphate, potassium phosphate, di-potassium phosphate, potassium chloride, potassium nitrate, potassium sulphate and ammonia phosphate fertilizer, phosphate fertilizer.

3. The method of claim 1 which further comprises the step of adding a pigment to the liquefied mixture before the step IV.

4. The method of claim 1 wherein said gelatinous substance is selected from the group consisting of sodium acrylate, polyvinyl chloride, polyvinyl acetate, methyl cellulose, and carboxyl methyl cellulose.

* * * * *